United States Patent [19]

Yamada et al.

[11] Patent Number: 5,319,623
[45] Date of Patent: Jun. 7, 1994

[54] DATA-TRACK SEARCH APPARATUS FOR LOCATING A DESIRED DATA TRACK ON A RECORD CARRIER

[75] Inventors: Shinichi Yamada, Hirakata; Mitsuro Moriya, Neyagawa; Hiroyuki Yamaguchi, Hirakata, all of Japan

[73] Assignee: Matsushita Electric Industrial Co., Ltd., Osaka, Japan

[21] Appl. No.: 538,556

[22] Filed: Jun. 15, 1990

[30] Foreign Application Priority Data

Jun. 19, 1989 [JP] Japan .................................. 1-156524

[51] Int. Cl.$^5$ .............................................. G11B 7/00
[52] U.S. Cl. ..................................... 369/44.32; 369/32
[58] Field of Search .............. 369/44.32, 32, 43, 50, 369/44.28, 44.29, 44.31, 44.33; 358/342

[56] References Cited

U.S. PATENT DOCUMENTS

| | | | |
|---|---|---|---|
| 4,243,850 | 1/1981 | Edward | 369/46 |
| 4,333,117 | 6/1982 | Johnson . | |
| 4,506,309 | 3/1985 | Joannov et al. | 360/137 |
| 4,701,897 | 10/1987 | Nakagawa | 369/32 |
| 4,805,163 | 2/1989 | Ohnuki | 369/44.32 |
| 4,858,214 | 8/1989 | Baba | 369/44.28 |
| 4,878,211 | 10/1989 | Suzuki et al. | 369/45 |
| 4,899,325 | 2/1990 | Katsuhara et al. | 369/32 |
| 4,901,299 | 2/1990 | Nakatsu | 369/44.28 |

FOREIGN PATENT DOCUMENTS 0096969 12/1983 European Pat. Off. .
0266226 3/1988 European Pat. Off. .
59-178654 10/1984 Japan .

OTHER PUBLICATIONS

"High Speed Accessing Magneto-Optical Disk Drive", SPIE, vol. 899–Optical Storage Technology & Applications, Ishibashi et al., (1988), pp. 8–15.

Primary Examiner—Tommy P. Chin
Assistant Examiner—Thai Tran
Attorney, Agent, or Firm—Wenderoth, Lind & Ponack

[57] ABSTRACT

A data-track search apparatus is provided with: a tracking error detection unit for detecting a positioning error between a light beam on a record carrier and a track; a moving unit for moving the light beam on the record carrier in a direction traversing the tracks on the record carrier; a focusing control failure detection unit for detecting a focusing control failure, and a control unit for controlling the moving unit in response to an output signal from the tracking error detection unit during the search for a desired track. The control unit regulates the moving unit so as not to accelerate but to decelerate the moving unit in the event of a focusing control failure.

2 Claims, 11 Drawing Sheets

DATA-TRACK SEARCH APPARATUS FOR LOCATING A DESIRED DATA TRACK ON A RECORD CARRIER

BACKGROUND OF THE INVENTION

1. Field of the Invention

The present invention relates to a data-track search apparatus for searching for a desired track on a record carrier having a great number of tracks.

2. Description of Prior Art

There exists as a data recording apparatus an optical reproducing apparatus which focuses and radiates a light beam emitted from a light source such as a semiconductor laser diode on a disk-like record carrier rotating at a constant rotation speed.

An example of such an apparatus is the optical apparatus as disclosed in "High speed accessing magneto-optical disk drive" (SPIE Vol. 899-Optical Storage Technology and Applications. 1988) by H. Ishibashi et al.

Provided on the record carrier of this apparatus are spirally or concentrically minute tracks having a width of 0.6 $\mu$m and a pitch of 1.6 $\mu$m. When signals recorded on the record carrier are reproduced, tracking is so controlled as to enable the light beam to be positioned on the track at all times, and a photodetector acts to receive a reflected light from the record carrier. A tracking error signal is similarly detected by the reflected light from the record carrier for effecting a tracking control so that the light beam will be put in position on the track of the record carrier. The tracking control is performed by feeding this tracking error signal back to a tracking actuator for moving the light beam incident on the record carrier in the direction traversing the tracks.

The function of search is indispensable for positioning the light beam on a desired one of many tracks contained on the record carrier.

The search is carried out by driving the tracking actuator in the direction toward of the desired track in such a manner that the light beam will go across the tracks with the tracking control out of action and restarting the tracking control on the desired track. For obtaining a speedy and stable search the tracking actuator is speed controlled so that the light beam may move at an almost determined velocity during the search. The speed control needs information of the moving speed and position of the light. The moving speed and position of the light beam is detected by a tracking error signal which may be generated when the light beam crosses the tracks as it is urged by the tracking actuator.

The speed of the light beam is detected by the tracking error signal cycle. The position of the light beam is detected by detecting from the tracking error signal a track crossing signal of alerting when the light beam has crossed the center of the tracks and counting the track crossing signal from the search start track.

In the conventional method, however, if a failure of the focusing control takes place due to vibrations or impact during search, the tracking error signal will be a constant value in spite of the fact that the tracking actuator is in motion. This, thus, makes it impossible to detect the moving speed of the light beam, and the driving amount of the tracking actuator will be correspond to the just previous moving speed. The impossibility of detecting the number of the tracks crossed will also result in the failure to detect the desired track. The tracking actuator will keep moving, accordingly, until it runs against the leader or termination. If the focusing control failure occurs when the tracking actuator drives to a great extent as it accelerates at the start of search, it will maintain its great driving amount. In such a case, the tracking actuator may run at an exorbitantly high speed against the leader or termination, and it may destroy itself in some cases.

SUMMARY OF THE INVENTION

The object of the present invention is to provide a highly reliable data-track search apparatus wherein any focusing control failure does not force the tracking actuator into an exorbitantly speedy drive.

In order to attain the above-described object, the data-track search apparatus in accordance with the present invention comprises a tracking error detection means for detecting a positional error of a light beam from a track on the record carrier, a moving means for moving the light beam incident on the record carrier in a direction traversing the the track on the record carrier, a focusing control failure detection means for detecting a failure of a focusing control, and a control means for controlling said moving means in response to an output signal from said, tracking error detection means in order to search for a desired track, said control means being inhibited from accelerating said moving means when judgement is made by the output signal from said focusing control failure detection means that a focusing control failure has been detected.

The reckless speedy run and subsequent collision of the moving means can be avoided by the described arrangement that the acceleration of the moving means may be prevented by the signal from the focusing control failure detection means upon occurrence of any focusing control failure.

DESCRIPTION OF THE PREFERRED EMBODIMENTS

The data-track search apparatus embodying the present invention will be described with reference to the drawings.

Figure 1:
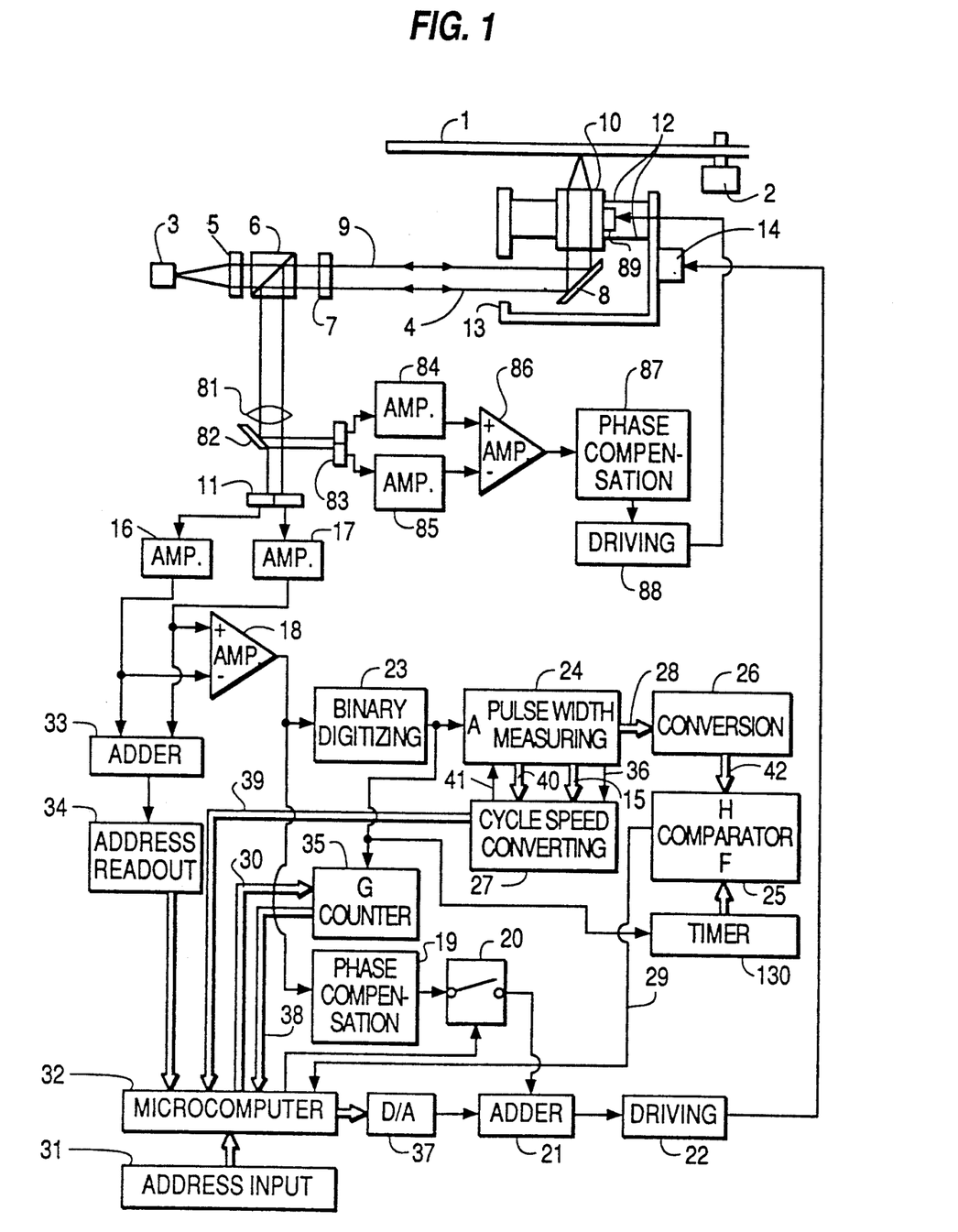
FIG. 1 is a block diagram showing a first embodiment of the present invention.

FIG. 1 is a block diagram of an optical reproducing apparatus using the data-track search apparatus of the first embodiment in accordance with the present invention.

A record carrier 1 is rotatable at a given rotational speed on the rotary shaft of a motor 2.

The record carrier contains signal recorded tracks having a width of 0.6 μm and a pitch of 1.6 μm and disposed in a spiral form. Each of the tracks has address signals recorded for identifying the tracks.

A light beam emitted from a light source 3 such as a semiconductor laser diode is converted by a coupling lens 5 into a parallel beam, which passes through a polarization beam splitter 6 and ¼ wavelength plate 7, and reflects against a total reflection mirror 8, and converges through an objective lens, and is focused onto the record carrier 1. The objective lens 10 is mounted on a frame 13 through two flat springs 12 so as to be movable relative to the frame 13 in the direction normal to the surface of the record carrier 1 and movable together with the frame 13 in the radial direction of the record carrier 1.

After being reflected by the record carrier 1, a reflected beam 9 passes through the objective lens 10, and is reflected by the total reflection mirror 8, and passes the ¼ wavelength plate 7 and is reflected by the polarization beam splitter 6 to be incident on a detection lens 81. A part of the reflected beam 9, after passing through the detection lens 81, falls on a photodetector 83 via a reflection mirror 82. The photodetector 83 has a divided structure. Output signals from the two divided parts of the photodetector 83 are amplified by amplifiers 84 and 85 respectively. The outputs from the amplifiers 84 and 85 are inputted to the input terminals of a differential amplifier 86 which will produce a signal in response to a difference between the input signals. The combination of the detection lens 81, reflection mirror 82 and photodetector 83 realizes the knife-edge principle for detection of a focus error. Consequently, the output of the differential amplifier 86 changes into a focus error signal representing the inconsistency in position between the light beam 4 focused by the objective lens 10 and the record carrier 1. The objective lens 10 is designed such that upon being energized, a coil 89 is subjected to an electromagnetic force so as to be movable perpendicularly with respect to the record carrier 1. The output signal of the differential amplifier 86 is supplied to the coil 89 via a phase compensation circuit 87 for compensation of the phase of a focusing control system and a drive circuit 88 for electrical amplification. In this connection, the objective lens 10 is driven in response to the signal from the differential amplifier 86 to act for focus control so that the light beam 4 may always be focused on the record carrier 1.

Part of the reflected beam 9, after being passed through the detection lens 81, irradiates a photodetector 11.

The frame 13 provided with the total reflection mirror 8 and 9 coil 14 has an arrangement such that the coil 14, when energized, is subjected to an electromagnetic force so that it may move in a radial direction with respect to the record carrier 1.

The movement of the frame 13 in the radial direction of the record carrier 1 is followed by the movement of objective lens 10 secured to the frame 13 via the flat-springs 12.

The light source 3, coupling lens 5, polarization beam splitter 6, ¼ wavelength plate 7, detection lens 81, reflection mirror 82 and photodetectors 11 and 83 are fixed to an apparatus frame (not shown).

The photodetector 11 has a divided structure, and has two outputs are destined to be received by amplifiers 16 and 17. The outputs of the amplifiers 16 and 17 are fed to the respective input terminals of a differential amplifier 18, which will output a signal in response to the difference between the two signals.

The output of the differential amplifier 18 will become a tracking error signal showing the positional error between the light beam 4 focused on the record carrier 1 and a track.

The output signal of the differential amplifier 18 is supplied to the coil 14 through a phase compensation circuit 19 for compensating for the phase of the tracking control system, a switch 20, an adder circuit 21, and a drive circuit 22 for electrical amplification. This ensures that the objective lens 10 will be driven in response to the signal from the differential amplifier 18 and that the light beam 4 converging on the record carrier 1 will be controlled to be put in position on the track all the time.

The output signals from the amplifiers 16 and 17 are transmitted to an adder circuit 33. The output signal of the adder circuit 33 is a reproduced signal, which is obtained from the record carrier 1 and which includes address data of the track. The output signal of the adder circuit 33 is fed into an address readout circuit 34, which will read out a specified address of the track.

An address input circuit 31 is intended to receive the address of the desired track to be searched for and to send the acquired output to a microcomputer 32. When the address of the desired track is inputted to the address input circuit 31, the microcomputer 32 takes the desired track address and the present track address of the record carrier 1 on which the light beam 4 is located.

The desired track address shall be referred to as N0, and the present track address as N1 (N0>N1) for simplification of the description to follow.

The microcomputer 32 computes the number of tracks (N0−N1) between the present track and desired track, and presets the value (N0−N1) on an counter 35 via a data bus line 30.

The microcomputer 32 has in a memory reference speeds in the form of a table, which correspond to the number of tracks counted up to the desired track, and wherein a reference speed corresponding to a detected number of tracks (N0−N1) is determined from the reference speed table, and the corresponding value is fed to a digital-analog converter (D/A converter) 37, while the tracking control is rendered inoperative with the switch 20 remaining open.

Since the output signal of the D/A converter 37 is transmitted to the coil 14 via the adder circuit 21 and drive circuit 22, the frame 13 is moved toward the desired track.

When the light beam 4 on the record carrier 1 traverses the tracks, there will arise in the output of the differential amplifier 18 a tracking error signal taking the form of a sine wave and having one cycle of a track pitch. This signal is fed to a binary-digitizing circuit 23 and phase compensation circuit 19. The output of the phase compensation circuit 19 gives no influence to any search operation because the switch 20 remains open.

The binary-digitizing circuit 23 serves to convert the input signal into a high- or low-leveled binary digitized signal which is outputted to a pulse width measuring circuit 24, a timer 130 and a counter 35.

The counter 35 detects a rising edge of an input binary digitized signal, and subtracts 1 from the measured value for each detection, thus resulting in the measured value being equal to the number of tracks counted up to the desired tracks.

The pulse width measuring circuit 24 is operable to measure the period of time in which the input signal is at a high or low level, and after the measurement, transfers a measurement completion flag showing the completion of measurement to a cycle speed converting circuit 27 via a data line 36, and then, outputs the measured value to a conversion circuit 26 via a data bus line 28. This particular output value is maintained until the following measurement is finished. The pulse width measuring circuit 24 also sorts out the measured value into three degrees, and transmits a degree data showing a degree and detailed data showing detailed values within the degree through a data line 40 and a data bus line 15.

Upon receiving the measurement completion flag, the cycle speed converting circuit 27 is adapted to read the respective degree data and detailed data via the data bus line 40 and data bus line 15, and thereafter transmits a pulse to a data line 41. This pulse acts to clear the measurement completion flag of the pulse width measuring circuit 24. The cycle speed converting circuit 27 includes a conversion table where the running speed of the light beam is associated with the detailed data, obtaining the running speed by means of the conversion table and a simple calculation upon input of the degree and detailed data, and feeding it to the microcomputer 32 via a data bus line 39.

The conversion circuit 26 functions to double the input value and to feed it to terminal H of a comparator 25.

A timer 130 is arranged such that it measures time and which measured value will be cleared at the rising and falling edges of the input signal. The measured value is always transmitted to terminal F of the comparator 25, which will necessarily compare the value input via the terminal F with the value input via a data bus line 42. If the measured value becomes larger than the value input via the data bus line 42, the microcomputer 32 will be instantly interrupted through a data bus line 29.

The microcomputer 32 reads out the running speed data of the cycle speed converting circuit 27 via the data bus line 39. Additionally, the microcomputer 32 reads out from the counter 35 the number of tracks counted up to the desired tracks via a data bus line 38, selecting a corresponding reference speed out of the reference speed table, calculating the difference between the running speed and the reference speed, and then feeding to the D/A converter 37 a value corresponding to the difference.

When the counted value of the counter 35 has become zero, i.e. when the light beam has reached the desired track, the microcomputer 32 sets the output value of the D/A converter 37 to zero and at the same time, closes the switch 20, causing the tracking control to put the search to end.

Now, description will be made of how to conduct operations when the focal point of the objective lens jumps out of the control range due to vibration or shocks during the search.

The jumping of the focal point of the objective lens is followed by the tracking error signal becoming a determined value with the result that the binary-digitized signal will remain at a high or low level. For this, the pulse width measuring circuit 24 may fail to complete its measurement to such an extent that it will furnish the cycle speed converting circuit 27 with the measurement completion flag showing the completion of measurement. This makes it impossible for the cycle speed converting circuit 27 to carry out the conversion to the running speed data, thereby being unable to supply any running speed data. Thus, the value fed by the microcomputer 32 to the D/A converter 37 will remain unchanged with the previous value kept suspended. Similarly, the count value of the counter 35 to show the number of tracks counted up to the desired track becomes equal to a determined value, and so no desired track can be detected at all. This may lead to a failure in speed control to result in an eventual reckless running of the frame 13. In such a condition, if the microcomputer 32 does not stop the motion of the frame 13 via the D/A converter 37, the frame 13 will collide against the leader or termination.

A description follows of the operations needed to detect the jumping of the focal point and to prevent said collision.

The staying of the binary digitizing signal at the high or low level will cause the measured values of the timer 130 to increase to a greater extent. As a result, the measured values of the timer 130 will get larger than the output values of the converting circuit 26. Accordingly, the comparator 25 will force the microcomputer 32 into interruption by the aid of the data line 29. The value inputted via the data bus line 42 is double as long in relation to the time during which the binary-digitized value stays at a high or low level after the measurement was over right before the occurrence of a focusing control failure, so that the focusing control failure can be detected by knowing that the time in which the binary-digitized signal stays at a high or low level has increased twice as long as the previous time.

Upon receipt of an interrupt signal supplied from the comparator 25 via the data line 29, the microcomputer 32 acts to decelerate the frame 13 within a short period of time, to calculate the optimum value as well as output time for the frame 13 to be stopped with reference to the running speed of the light beam, and to send the resultant values to the D/A converter 37.

For example, values of Ap and Tp can be determined which may satisfy the relationship shown by the following equation:

$$Vp = Ap \times Tp$$

in which Vp (m/s) is the previous running speed of the frame 13, Ap (m/s) is the degree of deceleration of the frame 13 resulting from the output value, and Tp (s) is the time of output, provided that a constant value may be outputted for a determined period of time. Thus, the frame 13 can decelerate and then stop, avoiding collision.

Setting of an output value destined for the D/A converter 37 may be performed on the basis of the running speed which has been measured before the occurrence of a focusing control failure for a plurality of times. If such a setting is carried out with reference to the average value of values determined by measurements done a plurality of times, averaging can be effected independent from the cycle of the tracking error signal which might have been influenced by disturbances such as dropout, thereby to ensure that a collision will positively be avoided. Also, the output of the constant value for a determined time may be rendered independent from the speed. In such a case, the programming of the microcomputer 32 can be so simplified as to enable an increase of its processing speed.

Furthermore, an arrangement may be made that the output of a signal serving to stop the frame 13 to the D/A converter 37 is limited to the case in which a focusing control failure occurs when the frame 13 is running with a high speed. In this case, if the D/A converter 37 outputs a constant value for a determined period of time irrespective of its speed, no reversion in course of the frame 13 will occur thanks to the output signal.

First, the operation of the binary-digitizing circuit 23 as shown in FIG. 1 will be described using FIGS. 2a-2c.

Figure 2A:
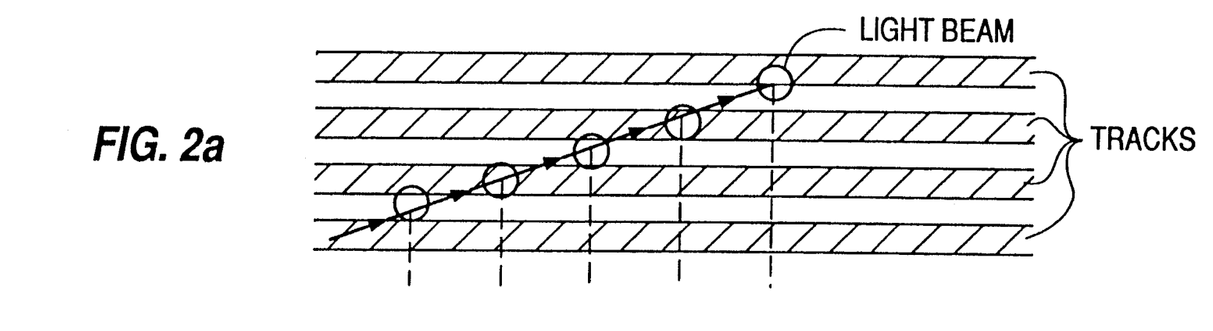
FIGS. 2a-2c are waveform diagrams showing the relationship between a light beam, the position of the tracks, and tracking error signals and binary-digitized tracking error signal.
Figure 2B:
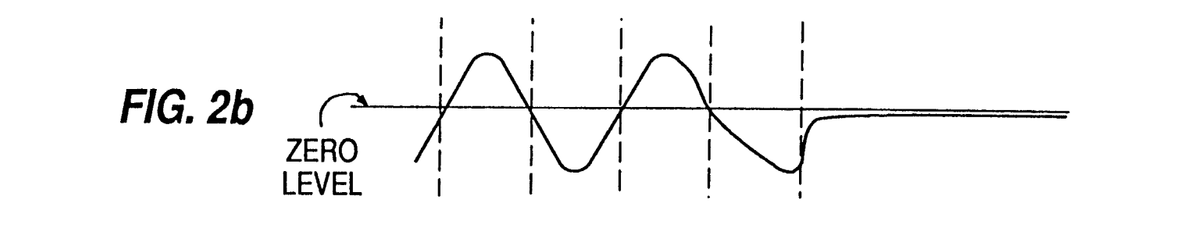
Figure 2C:
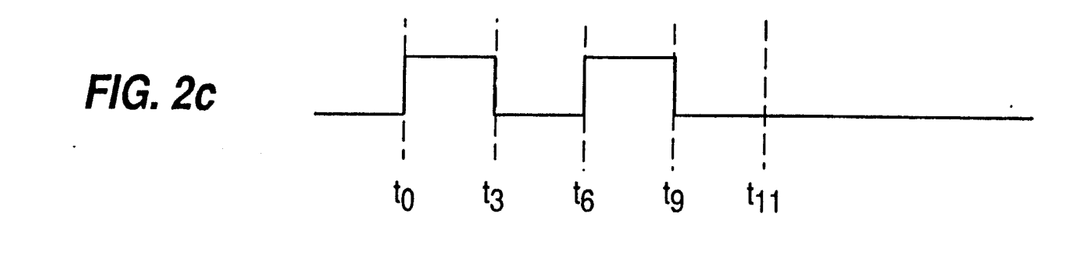

Provided that the focusing control failure arises at the time t 11 in FIG. 2a, a waveform as shown in FIG. 2b is inputted to the binary-digitizing circuit 23, which will output a waveform as shown in FIG. 2c transformed and binary-digitized with reference to the zero level. The rising edge at the time t3 or t9 of the waveform of FIG. 2c indicates that the light beam has crossed over a track. Therefore, the counter 35 in accordance with FIG. 1 subtracts 1 (one) from the counted value each time the rising edge of the input signal is detected, until the counted value comes to imply the number of tracks counted up to a desired track.

Figure 3:
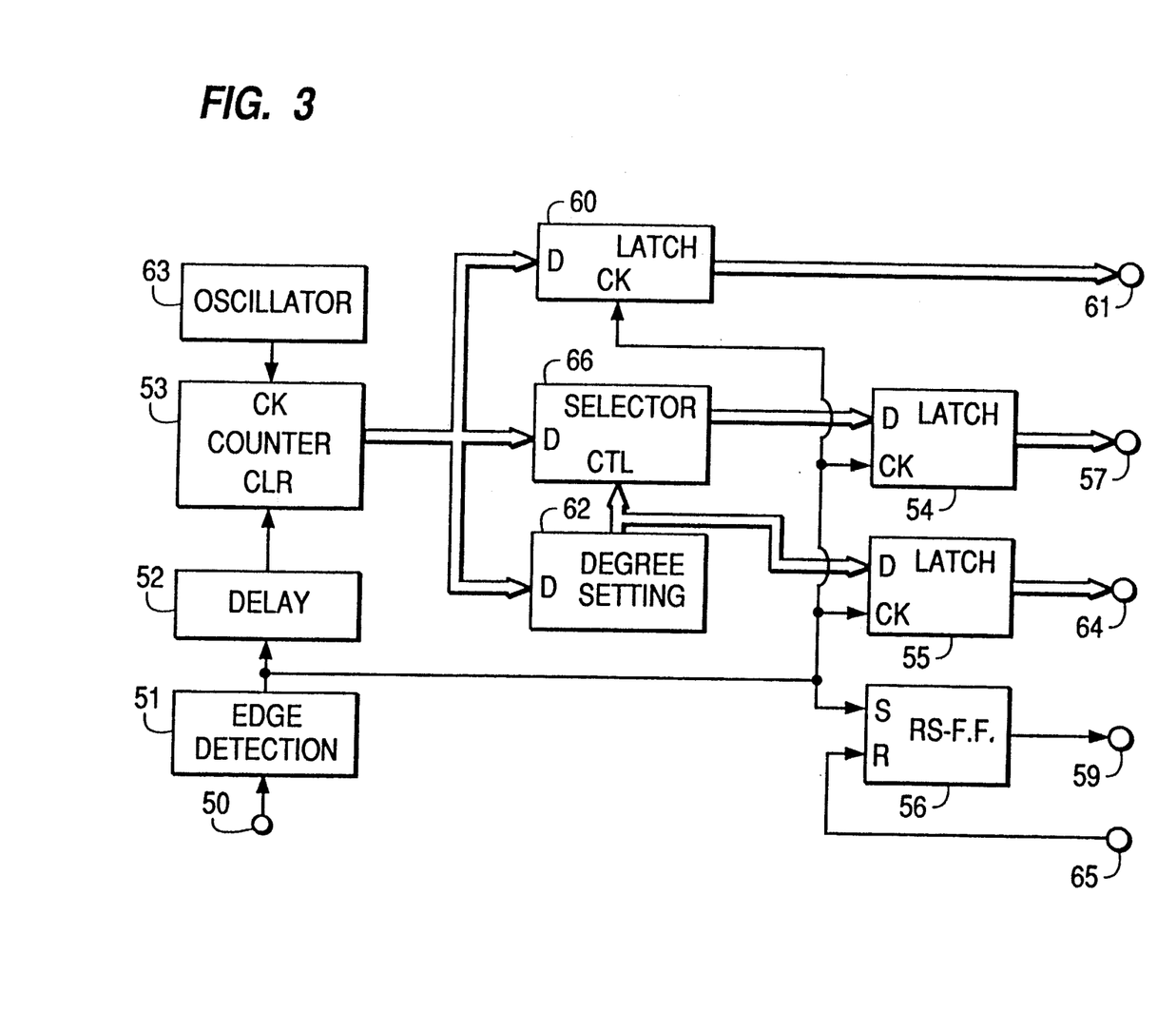
FIG. 3 is a block diagram of a pulse width measuring circuit for measuring the period during which the binary-digitized signal stays at a high or low level.

A detailed description of the operation of the pulse width measuring circuit 24 as shown in FIG. 1 follows, using the block diagram of the pulse width measuring circuit 24 shown in FIG. 3 and the timing chart of FIGS. 4a-4e.

The description shall start with the block diagram as shown in FIG. 3.

A first input terminal 50 is connected to the output terminal of the binary-digitizing circuit 23 of FIG. 1. A second input terminal 65 is connected to the data line 41 of FIG. 1. A first output terminal 57 is connected to the data bus line 15 of FIG. 1. A second output terminal 64 is connected to the data bus line 40 of FIG. 1. A third output terminal 59 is connected to the data line 36. A fourth output terminal 61 is connected to the data bus line 28 of FIG. 1.

The output of the binary-digitizing circuit 23 to be received by the first input terminal 50 is directed to an edge detection circuit 51.

The edge detection circuit 51 serves to detect the rising and falling edges of a binary-digitized signal for subsequent output of a pulse. The output of the edge detection circuit 51 is destined to pass through a RS flip-flop 56 and a delay circuit 52 until the terminals CK of first, second and third latch circuits 54, 55 and 60 are reached by the output respectively.

The delay circuit 52 is adapted to delay the input signal and then to transmit an output to the terminal CLR of a counter 53. The amount of such a time delay is set to be smaller than the cycle Ts of an oscillator 63.

The counted value is cleared by a pulse inputted to the terminal CLR of the counter 53, which in turn counts a clock output from the oscillator 63 to the terminal CK. Hence, the counted value immediately before being cleared is equal to the number of clocks for a period of time during which the binary-digitized signal stays at a high or low level. The counter 53 is capable of counting 16 binary digits, thereby displaying in parallel separate data of 16 binary digits. The counted values from the counter 63 are directed to the terminals D of the degree setting circuit 62, selector 66 and the third latch circuit 60 respectively.

On receiving a pulse at the terminal CK, the third latch circuit 60 maintains the data as then stored in the terminal D, providing an output from the fourth output terminal 61 to the cycle speed converting circuit 27.

The degree setting circuit 62 classifies the data received by the terminal D into three different degrees, and then transmits each signals indicating the areas to the selector 66 and the second latch circuit 55. The data inputted to the terminal D and having its upper eight bits of equal to zero is identified as the first degree, and what is identified as the second degree, not included in the first degree, has its upper four bits equal to zero. The remaining data is identified as the third degree.

Dependent on a signal showing the degree to be received by the terminal CTL, the selector 66 is adapted to select eight bits out of the 16-bits of data to be inputted to the terminal D, and to supply the eight-bit data to the first latch circuit 54. The lower eight-bit data for the first degree, the eight-bit data exclusive of the upper and lower four-bit data for the second degree and the upper eight-bit data for the third degree will be supplied.

When a pulse is received by the terminal CK, the first and second latch circuits 54 and 55 maintain the data of the terminal D and transmits them to the first and second terminals 57 and 64 respectively. Thus, the signals received at the first and second terminals 57 and 64 will be results of conversion into the degree data and detail data of what has been obtained by measurement of the period during which the binary-digitized signal is at a high or low level. A reproduction of the time for the high or low level using the result of the measurement will provide a result of the multiplication of Ts by the detail data in the case of the first degree, and another result of the multiplication of said result by 16 in the case of the second degree, and a further result of the multiplication of said result of the first degree by 256 in the case of the third degree.

Upon receipt of a pulse by the terminal S, the RS flip-flop 56 will transmit a high level output to the third output terminal 59 to give to the cycle speed converting circuit 27 a flag denoting the completion of the measurement. Additionally, if a pulse from the input terminal 65 reaches the terminal R, the RS flip-flop 56 will feed a low level output to the third terminal 59.

The operation of said pulse width measuring circuit 24 will be described with reference to the timing chart as shown in FIGS. 4a-4e.

Figure 4A:
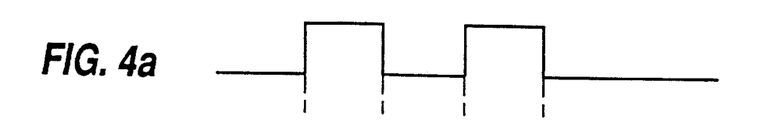
FIGS. 4a-4e are timing charts for describing the pulse width measuring circuit.
Figure 4B:
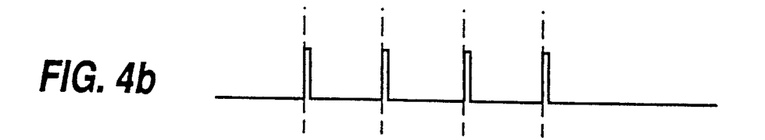
Figure 4C:
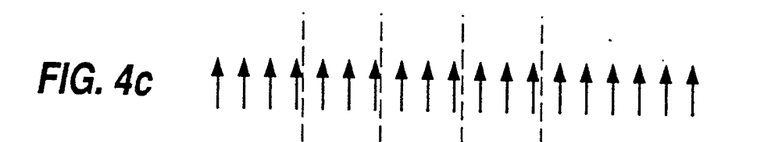
Figure 4D:
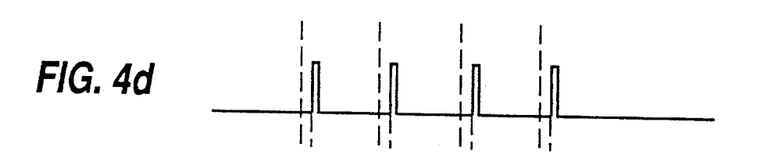
Figure 4E:
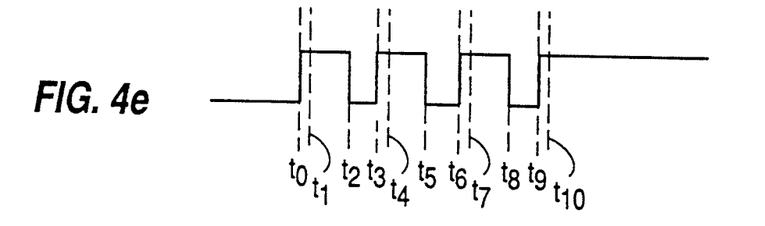

FIG. 4a is an output waveform from the binary-digitizing circuit 23, and the remaining waveforms of FIGS. 4b-4e are transformations of the waveform of FIG. 4a when inputted from the first input terminal 50. It is noted that this waveform is identical to the waveform 2c as shown in FIG. 2 which was used to explain the binary-digitizing circuit 23. The waveform of FIG. 4b indicates pulses of the output of an edge detection circuit 51 shown in FIG. 3. The waveform of FIG. 4c is an output waveform from the oscillator 63. The waveform of FIG. 4d designates an output waveform from the delay circuit 52. The waveform of FIG. 4e designates an output waveform of the RS flip-flop 56.

If the waveform of FIG. 4a is inputted to the first input terminal 50 of FIG. 3, the output of the edge detection circuit 51 will develop into the waveform of FIG. 4b by which the edge was detected. When pulses at t0, t3, t6, and t9 of the waveform of FIG. 4b are inputted to the delay circuit 52, the waveform of FIG. 4d will be outputted. The counter 53 will be cleared by pulses t1, t4, t7, and t10 of the waveform of FIG. 4d. The third latch circuit 60 maintains counted values of the counter 53 by the aid of the pulses at t0, t3, t6, and t9 of the waveform of FIG. 4b.

The first latch circuit 54 maintains and produces a supply of the output from the selector 66 by means of the pulses at t0, t3, t6, and t9. Similarly, the second latch circuit 55 maintains and produces a supply of the output of the degree setting circuit 62 for showing areas.

For example, since the output generated from the counter 53 right before the time t9 is 3, this counted value is to be classified as the first degree by the degree setting circuit 62. On the base of this classification, the selector 66 selects and outputs the last eight digits from the output of sixteen binary digits. Consequently, the output produced at the time t9 by the first latch circuit 54 is 3, and the second latch circuit 55 represents the first degree.

At the entry of the pulses at t0, t3, t6, and t9 of, the waveform of FIG. 4b, into the terminal S, the RS flip-flop 56 will produce a high level output, giving to the cycle speed converting circuit 27 a flag denoting the completion of the measurement. This particular high level output signal is cleared by pulses which has been inputted to the terminal R at the times t2, t5, t8 via the input terminal 65.

The detailed operation of the cycle speed converting circuit 27 in accordance with FIG. 1 will be described.

The conversion table incorporated in the cycle speed converting circuit 27 includes addresses 0-255. Each address is associated with each detail data as an output from the pulse width measuring circuit 24. In each address is stored a binary-digit value W which can be found by the following equation.

$$W = P/(Nad \times Ts \times 2)$$

where P is track pitch, Ts is the cycle of the oscillator 63 within the pulse width measuring circuit 24, and Nad is the address.

This may identify W as a moving speed when the degree data is the first degree, whereby the value W is fed to the microcomputer 32. In case of the second degree, a value resulting from the division of W by 16 will be the moving speed. Similarly, in case of the third degree, a value resulting from the division by 256 will be the moving speed. Since W is a binary digit, the operation for division by 16 can be performed by shifting W by four bits in the right direction. Similarly, a shift by eight bits will take place in case of 256.

The detail operation of the timer 130 and comparator 25 as shown by FIG. 1 will be described using the block diagram of FIG. 5 and the timing chart of FIGS. 6a-6d.

Figure 5:
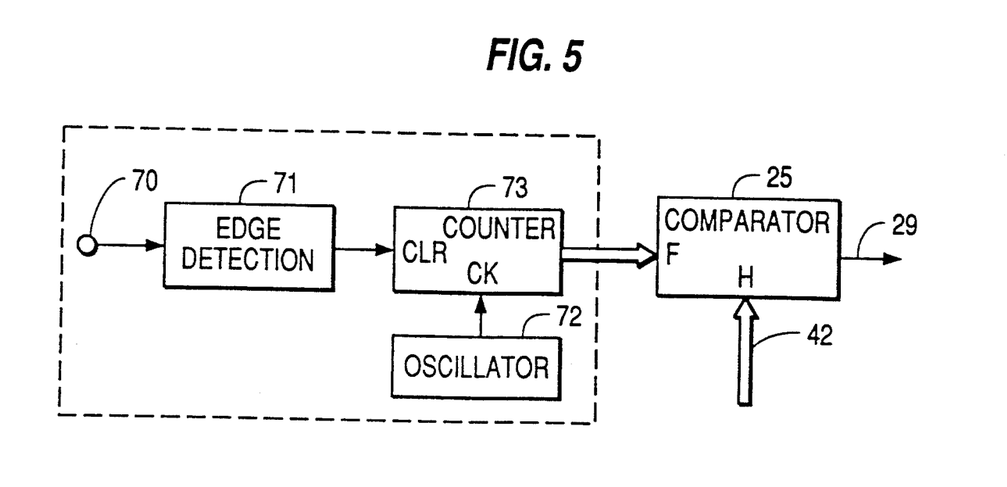
FIG. 5 is a block diagram showing a timer and comparator for detecting a focusing control failure in the first embodiment.

The description shall start with the block diagram of FIG. 5. The portion enclosed by a dotted line represents the timer 130.

An input terminal 70 is connected to the output of the binary-digitizing circuit 23 of FIG. 1. The comparator 25 is connected at its terminal H to the data bus line 42 of FIG. 1. The output of the comparator 25 is connected to the data line 29 of FIG. 1.

After receiving input data at the terminal 70, the binary-digitizing circuit 23 outputs the data to an edge detection circuit 71.

The edge detection circuit 71 detects rising and falling edges of a binary-digitized signal and outputs the pulse. The output pulse of the edge detection circuit 71 is transmitted to the terminal CLR of a counter 73.

The counter 73 counts a clock from an oscillator 72 received at the terminal CK.

Upon receipt of the pulse at the terminal CLR, the counter 73 clears the counted value and restarts counting. Therefore, the counted value immediately before it is cleared is the number of clocks ready to be inputted in the period of a high or low level of the binary-digitized signal. The counter 73 is capable of counting seventeen binary digits so that data each having seventeen bits can be outputted in parallel. The cycle of the oscillator 72 is identical to that of the oscillator 63 of the pulse width measuring circuit 24. The counted value by the counter 73 is delivered to the terminal F of the comparator 25. The output of the comparator 25 will change to a high level when the value at the terminal F exceeds the value at the terminal H.

The operations of the respective circuits as described above will be described using the timing chart illustrated in FIGS. 6a-6d.

Figure 6A:
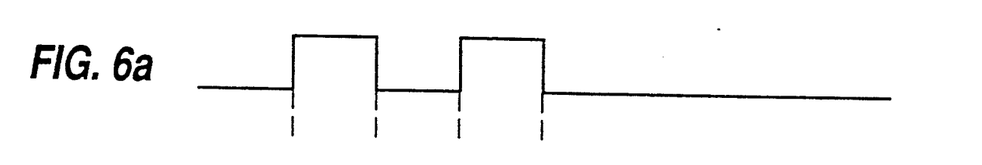
FIGS. 6a-6d are timing charts for explaining the operations of the timer and comparator in the first embodiment.
Figure 6B:
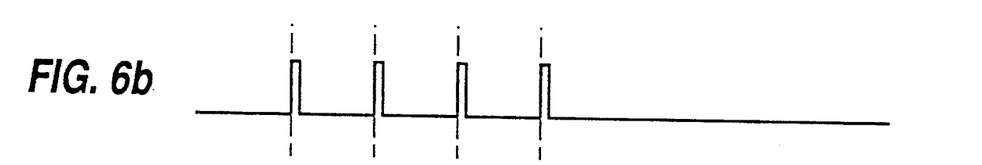
Figure 6C:
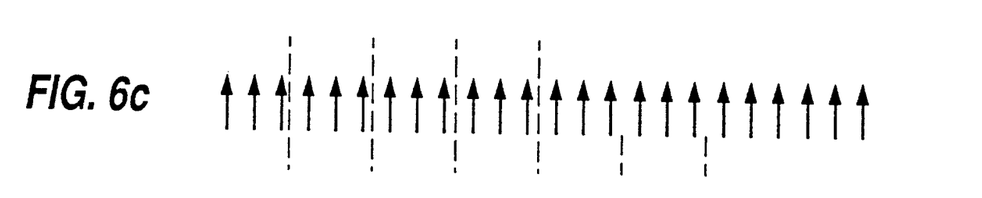
Figure 6D:
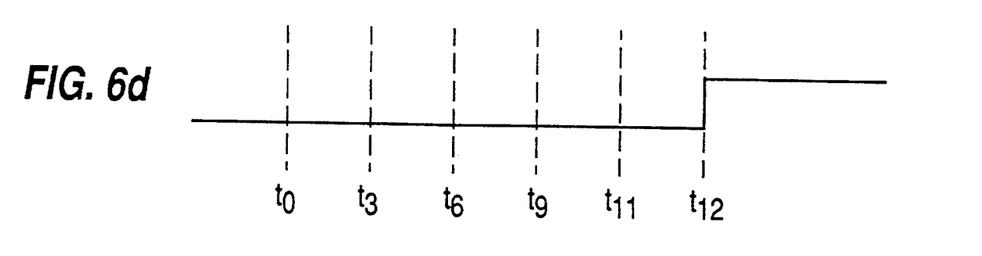

FIG. 6a shows an output waveform from the binary-digitizing circuit 23 and the waveforms of FIGS. 6b-6d are produced when the waveform of FIG. 6a was inputted from the input terminal 70. This specific waveform is identical to, the waveform of FIG. 2d used for explaining the binary-digitizing circuit 23. This, therefore, indicates that a focusing control failure occurred at time t11. The waveform of FIG. 6b designates an output waveform of the edge detection circuit 71 shown in FIG. 5. The waveform of FIG. 6c designates a rising edge of the output of the oscillator 72. The waveform of FIG. 6d designates an output waveform of the comparator 25.

The waveform of FIG. 6a which has entered the input terminal 70 of FIG. 5 will be outputted from the edge detection circuit 71, taking the form of the waveform of FIG. 6b which has conducted an edge detection. When the pulses t0, t3, t6, and t9 of the waveform of FIG. 6b are inputted to a counter 73, the counted values will be cleared. The counter 73 restarts counting. As described above, 3 has been outputted from the pulse width measuring circuit 24 to the data bus line 28 at time t9. Consequently, the conversion circuit 26 has put forward 6, a value twice as large as 3, to the comparator 25 via the data bus line 42. Thus, if a focusing control failure arises at time t11, followed by the binary-digitized signal having reached a low level, the counted value of the counter 73 will become 6 and the output of the comparator 25 change to a high level. This makes it possible for the microcomputer 32 to judge that there has been an occurrence of the focusing control failure and to transmit to D/A converter 37 a value for decelerating the frame 13.

As mentioned above, to cope with any possible event during a search, when a focusing control failure takes place and the present cycle of the tracking error signal exceeds by over twice the cycle right before such an excess has occurred, there may be calculated from the previous cycle the optimum value and output a time for decelerating and stopping the frame 13 for a short period of time, which resultant data will be outputted to the D/A converter 37 with the result that the frame 13 will stop its motion, avoiding any reckless run and collision against the leader or termination.

The foregoing embodiment provides the arrangement such that the conversion circuit 26 is operative to output a value twice as large as the cycle of the tracking error signal which has been measured immediately before the occurrence of a focusing control failure, but this embodiment can vary the multiplier with the possibility remaining of detection of a focusing control failure within a short time and prevention of collision as well. A variation may be provided that the use of the cycle of the tracking error signal measured right before the focusing control failure may be replaced by that of cycles measured a plurality of times right before the occurrence of the focusing control failure. Furthermore, a use of an averaged value of cycles measured several times allows averaging of the cycles of the tracking error signal even if affected by any disturbance such as a dropout to ensure that a precise detection will be achieved of the focusing control failure. Another arrangement could be such that a constant value may be outputted irrespective of any measured cycles. This arrangement only needs simplified circuitry.

The pulse width measuring circuit 24 may be changed, while retaining the accuracy and stability of the speed control system, in the arrangement that can convert the counting result into three degrees and determined binary eight digit numbers by the use of the counting circuit for sixteen binary digits.

The second embodiment of the present invention is described below.

Figure 7:
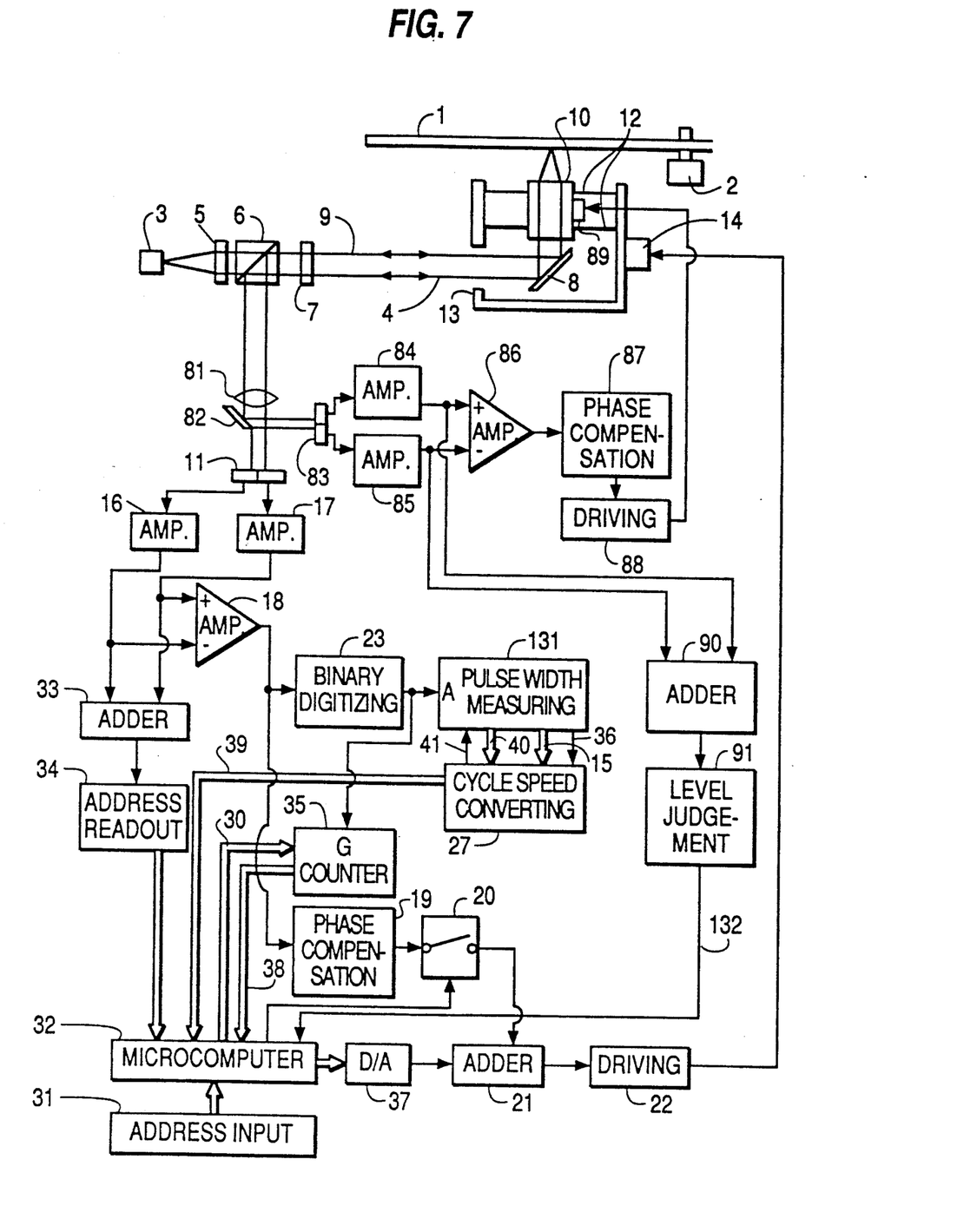
FIG. 7 is a block diagram for explaining a second embodiment of the present invention.

FIG. 7 is a block diagram of an optical reproducing apparatus of the second embodiment of the present invention using the data-track search apparatus. The same portions as those of the optical reproducing apparatus of the first embodiment using the data-track search apparatus shall be applied the like reference numbers with no additional explanation thereof.

The task of an adder circuit 90 is to perform an addition of the output signals from the amplifiers 84 and 85, and to transmit a signal resulting from such an addition to a level judgement circuit 91, which will detect a focusing control failure based on the input signal to subject the microcomputer 32 to interruption via a data line 132. A pulse width measuring circuit 131 is identical to the pulse width measuring circuit 24 as described with reference to FIG. 3 except that the former has no third latch circuit 60 and fourth output terminal 61.

Figure 8:
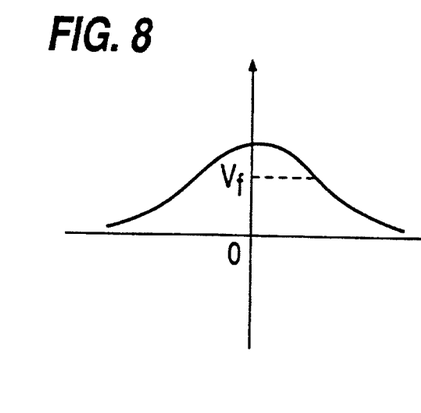
FIG. 8 is a waveform diagram for explaining an adder circuit in the second embodiment.

The output signal from the adder circuit 90 will be described with reference to FIG. 8. The lateral axis of FIG. 8 indicates the distance between the focal position of the light beam 4 focused by the converging lens 10 and the record carrier 1. The output signal of the adder circuit 90 decreases as the distance gets longer. This enables the detection of any focusing control failure on the base of this signal resulting from the addition.

Figure 9:
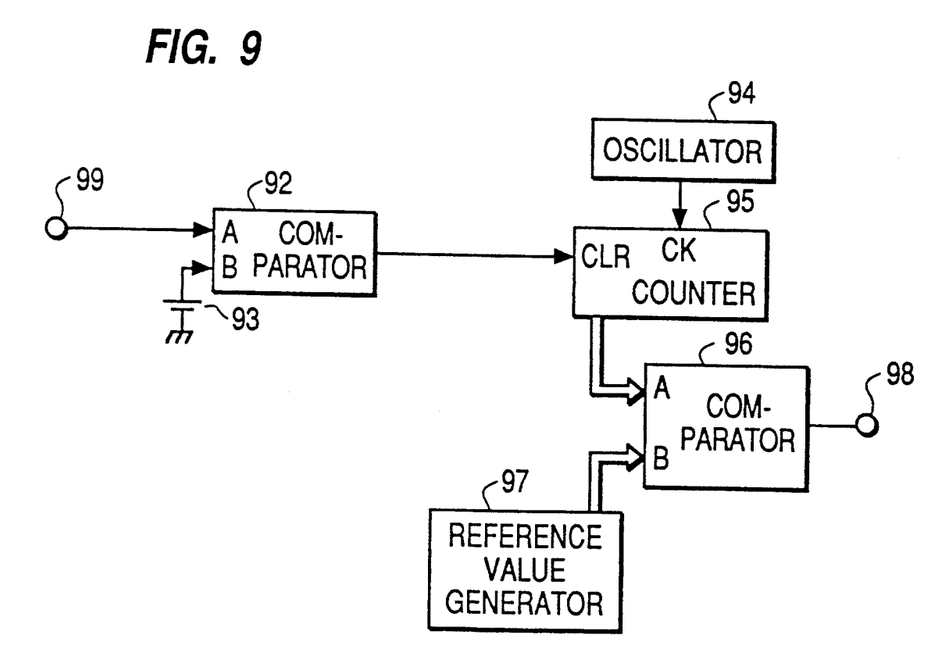
FIG. 9 is a block diagram of a level judgement circuit for detection of focusing control failure in the second embodiment.

The operation of the level judgement circuit 91 for the detection of a focusing control failure will be described with reference to the block view of the level judgement circuit 91 as shown in FIG. 9 and the timing chart of FIGS. 10a–10d.

An input terminal 99 of FIG. 9 is connected to the output terminal of the add circuit 90 to receive an add signal. A comparator 92 is designed to output a low level if a signal level of a terminal A becomes smaller than that of a terminal B. A reference voltage source 93 transmits a reference signal level to the comparator 92 at the terminal B. A counter 95 counts rising edges of the signal inputted to the terminal CK and sends the count value to a comparator 96 at its terminal A. In the counter 95, the counted value is cleared into zero during the time when the terminal CLR is at a high level. An oscillator 94 functions to generate a clock of a constant cycle and to supply it to the terminal CK of the counter 95. The comparator 96 transmits a high level signal to an output terminal 98 the instant a value to be received by the terminal A exceeds a value to be received by the terminal B. A reference value generator 97 transmits a reference value to the terminal B of the comparator 96. The output terminal 98 is connected to the microcomputer 32.

Figure 10A:
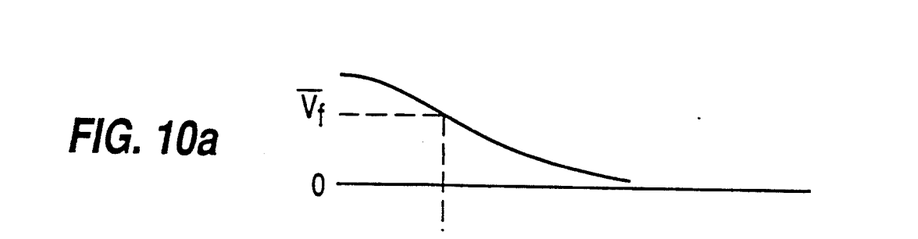
FIGS. 10a-10d are timing charts for explaining the operation of the level judgement circuit of the second embodiment.
Figure 10B:
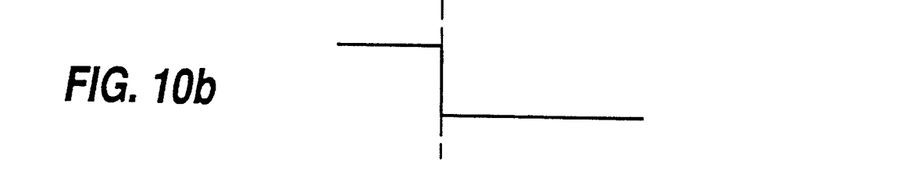
Figure 10C:
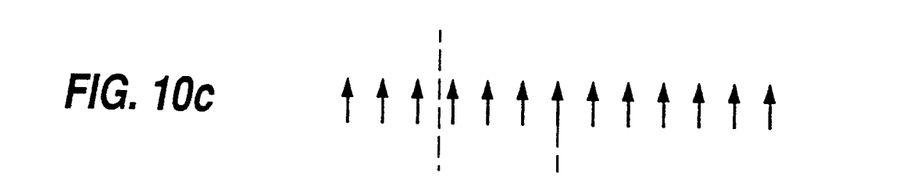
Figure 10D:
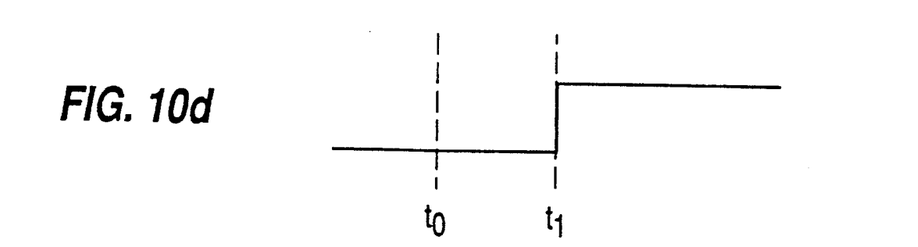

The operation of detection of a focusing control failure will be described with reference to FIGS. 10a–10d. Let the signal level outputted by the reference voltage source 93 denote Vf, and also let the output value of the reference value generator 97 be 3. The waveform of FIG. 10a designates a signal to be inputted to the input terminal 99 in the event of occurrence of a focusing control failure. As the focus error grows greater, the signal level becomes lower. The waveform of FIG. 10b shows the output of the comparator 92, the waveform of FIG. 10c shows a rising edge outputted by the oscillator 94 and the waveform of FIG. 10d shows an output waveform of the comparator 96.

When the signal level reaches Vf at time t0, the output of the comparator 92 changes to a low level. This leads the counter 95 to restart of counting. The counted value will be 3 at time t1, and the comparator will output a high level. In this way, the detection of a focusing control failure can be achieved by the level judgement circuit 91. Any failure due to noise or the like can be prevented by the detection of a focus error which may occur if a signal resulting from the addition happens to remain at a level lower than Vf continuously for a determined period of time.

The signal level Vf of the reference voltage source 93 needs to be established as a value smaller than the maximum value of an add signal. Although the reference value of the reference value generator 97 has been referred to as 3, it may be defined as any value which may cause avoidance of collision of the frame 13.

The third embodiment of the present invention is described below.

Figure 11:
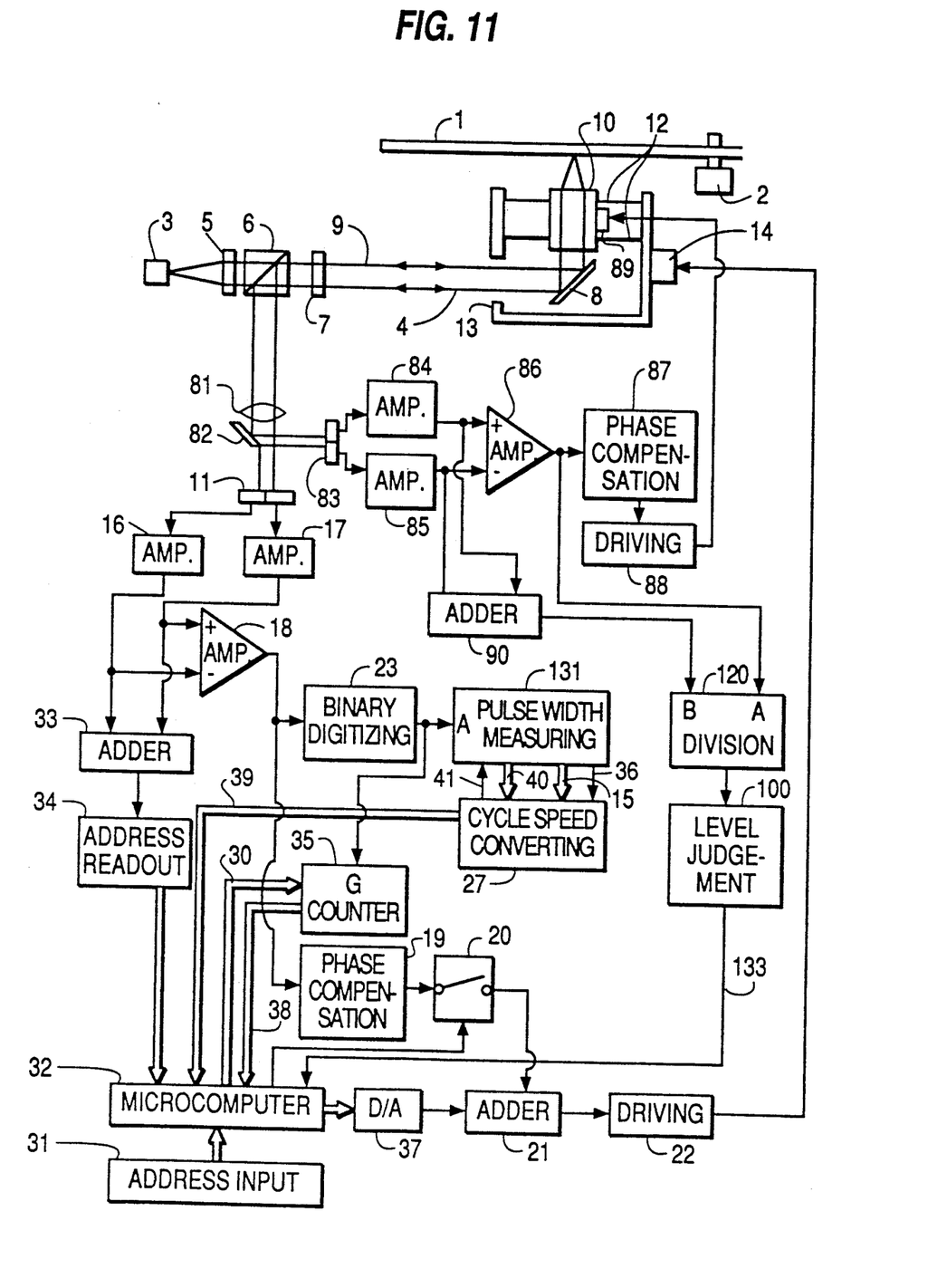
FIG. 11 is a block diagram for explaining a third embodiment of the present invention.

FIG. 11 is a block diagram of an optical reproducing apparatus of the third embodiment of the present invention, using the data-track search apparatus. Like reference numbers shall be applied to same parts as those of the optical reproducing apparatus using the data-track search apparatuses of the first embodiment as shown in FIG. 1 and of the second embodiment as shown in FIG. 7, with no additional description thereof.

A division circuit 120 divides a signal level inputted to the terminal A by a signal level inputted to the terminal B. Therefore, the output from the division circuit 120 will be converted to a focus error signal which will never be influenced by any variations in reluctance of the record carrier 1 and strength of the light source 3. A level judgement circuit 100 detects a focusing control failure based on an input signal, subjecting the microcomputer 32 to an interruption via a data line 130.

Figure 12A:
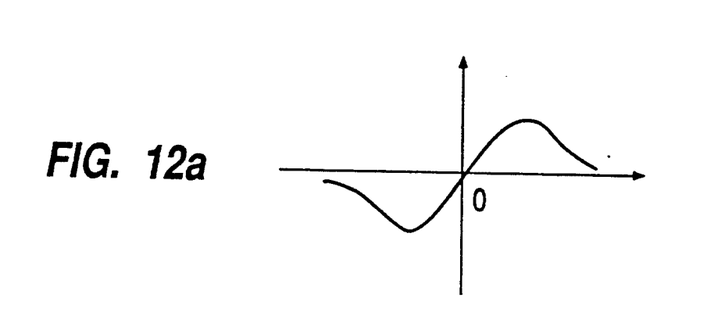
FIGS. 12a-12c are waveform diagrams for explaining the operation of a division circuit of the third embodiment.
Figure 12B:
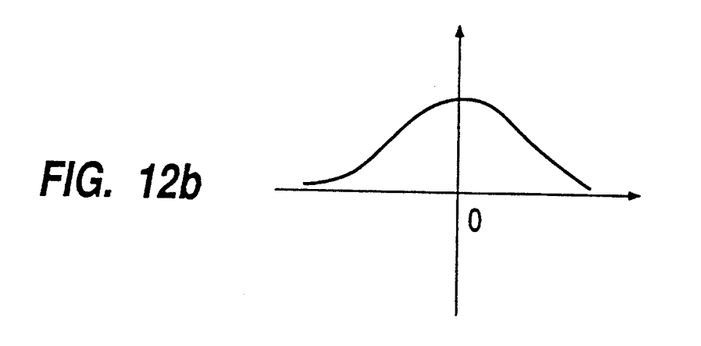
Figure 12C:
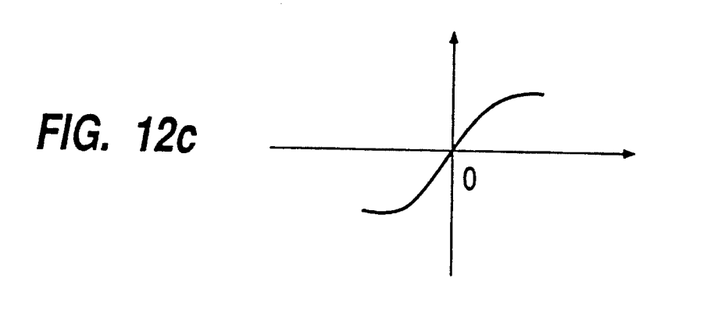

The output signal of the division circuit 120 will be described with reference to FIGS. 12a-12c. The abscissa axes of FIGS. 12a-12c indicate the distance between the focal position of the light beam 4 focused by the converging lens 10 and the record carrier 1. The waveform of FIG. 12a shows a focus error signal outputted from the differential amplifier 86. This specific signal is destined to be received by the terminal A of the division circuit 120. The waveform of FIG. 12b shows an output waveform of the adder circuit 90, which will be supplied to the terminal B of the division circuit 120. Thus, it is the waveform of FIG. 12c that the division circuit 120 outputs. The output level of the differential amplifier 86 is liable to be governed by the variations of the reflectance of the record carrier 1 and the strength of the light source 3, but an attempt of division by a signal resulting from the addition by the adder circuit 90 allows conversion of said output level into a focus error signal which is immune from any variations in the reflectance of the record carrier 1 and the strength of the light source 3.

Figure 13:
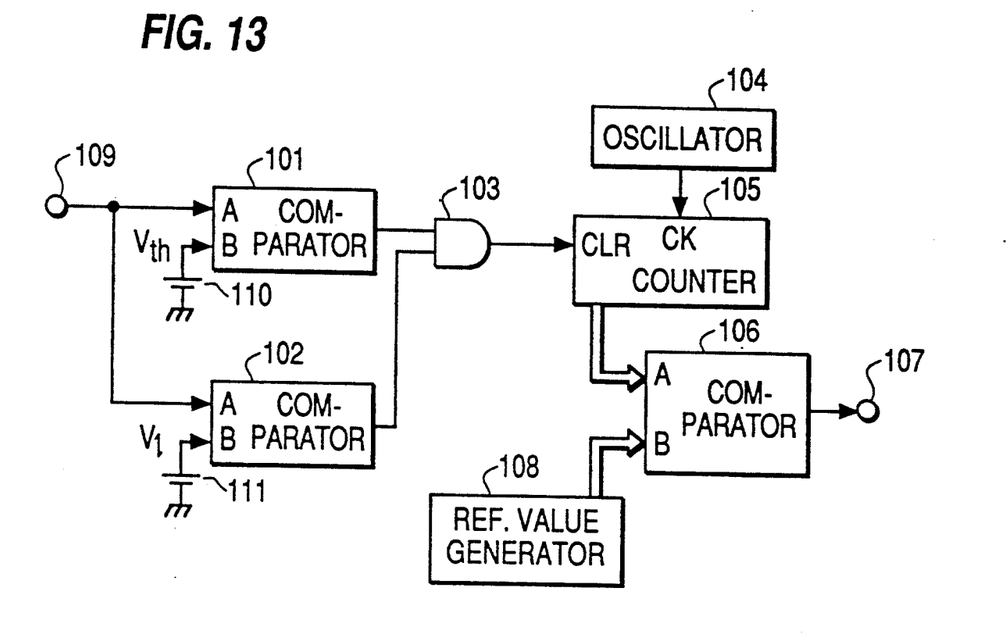
FIG. 13 is a block diagram of a level judgement circuit for detecting a focusing control failure in the third embodiment.

The operation of the level judgement circuit 100 for detecting a focusing control failure will be described with reference to a block diagram of the level judgement circuit 100 in FIG. 13 and a timing chart as shown in FIGS. 14a-14d.

An input terminal 109 is connected to the input terminal of the division circuit 120, and a signal resulting from the division is transmitted separately to comparators 101 and 102. The comparator 101 will output a low level if the signal level from the terminal A is greater than that of the terminal B. The comparator 102 will output a low level if the signal level of the terminal A is smaller than that of the terminal B. A reference voltage source 110 transmits a reference value Vh to the terminal A of the comparator 101, and a reference voltage source 111 transmits a reference value Vl to the terminal A of the comparator 102. A logic circuit 103 is to output a high level only when the output signal is at a high level. A counter 105 is operative to count rising edges inputted to the terminal CK, and then to supply the count value to the terminal A of a comparator 106. In the counter 105, the counted value will be cleared to zero when the terminal CLR is at a high level. An oscillator 104 generates and transmits a clock on a constant cycle to the terminal CK of the counter 105. The comparator 106 will deliver a high level signal to an output terminal 107 if a value inputted to the terminal A is greater than a value inputted to the terminal B. A reference value generator 108 transmits a reference value to the comparator 96. The output terminal 107 is connected to the microcomputer 32.

Figure 14A:
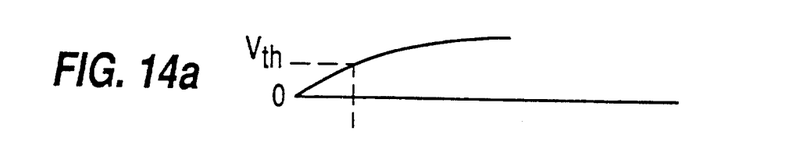
FIGS. 14a-14d are timing charts for explaining the operation of the level judgement circuit of the third embodiment.

The operation of the detection of a focusing control failure will be described with reference to the timing chart of FIGS. 14a-14d. Suppose the output value of the reference value generator 108=3. The waveform of FIG. 14a shows a focus error signal to be inputted to a terminal 109 intended for occurrence of a focusing control failure. It shows the signal level that grows higher as the focus error signal becomes greater.

Figure 14B:
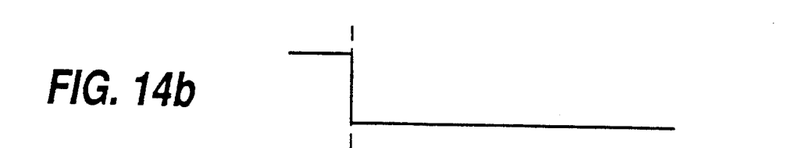
Figure 14C:
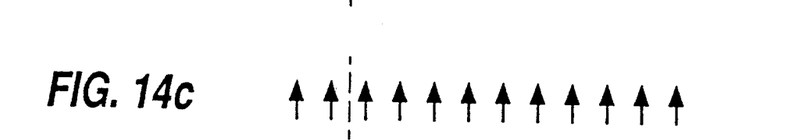
Figure 14D:
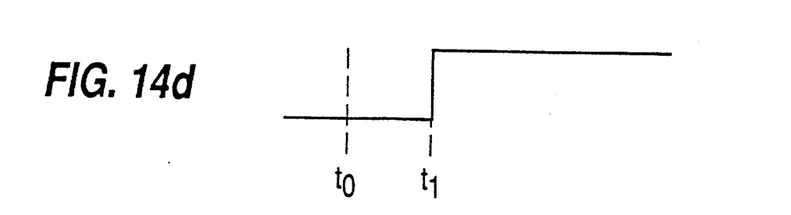

The waveform of FIG. 14b shows an output of the comparator 101. The waveform of FIG. 14c shows rising edges of the output of the oscillator 104, and the waveform of FIG. 14d shows an output waveform of the comparator 106.

With the signal level being Vh at time t0, the output of the comparator 101 is at a low level. This urges the counter 105 to restart the counting operation. When the counted value becomes 3, the comparator 106 outputs a high level, thus resulting in the discovery of a focusing control failure by the level judgement circuit 100.

The process for detection of the focusing control failure due to the level of the focus error signal enables a short time detection of a focusing control failure. Any malfunction due to noise and the like can be avoided by the detection of a focusing control failure when the level of the focus error signal remains higher than Vh or smaller than Vl for a determined period of time.

The signal level Vh of the reference voltage source 110 must be set to be smaller than the maximum value of a focus error signal resulting from the division. Similarly, the signal level Vl of the reference voltage source 111 must be set to be larger than the minimum value of a focus error signal resulting from the division. Although the reference value has been referred to as 3, it can be defined as any value which may cause the prevention of collision of the frame 13. With the reflectance of the record carrier 1 and the strength of the light source 3 showing a small variation respectively, a transmission of the output of the differential amplifier 86 immediately to the level judgement circuit 100 may be followed by a detection of a focusing control failure based on the fed signal.

What is claimed is:

1. An apparatus for detecting a focusing control failure of a light beam irradiating a record carrier having a plurality of data tracks formed thereon, comprising:

a focusing error detecting means for detecting a focus error of the light beam on the record carrier and for generating a focus error signal indicating the focus error;

a focusing control means responsive to said focus error signal for controlling focusing of the light beam so that the light beam is focused on the record carrier, said focusing control means causing a focusing control failure thereof when the focus error of the light beam on the record carrier is out of a focusing controllable range;

a tracking error detection means for detecting a position error between the light beam incident on the record carrier and a track and for generating a tracking error signal showing the position error in response thereof, said tracking error signal being valid when the light beam is under control of said focusing control means;

a moving means for moving the light beam on the record carrier in a direction traversing the tracks on the record carrier; and a focusing control failure detection means for judging that the focusing control failure of said focusing control means has occurred when a cycle of said tracking error signal which is produced during the movement of the light beam driven by said moving means has become longer than a predetermined cycle;

wherein the focusing control failure detection means changes said predetermined cycle in accordance with the cycle of the tracking error signal.

2. An apparatus for detecting a focusing control failure of a light beam irradiating a record carrier having a plurality of data tracks formed thereon, comprising:

a focusing error detecting means for detecting a focus error of the light beam on the record carrier and for generating a focus error signal indicating the focus error;

a focusing control means responsive to said focus error signal for controlling focusing of the light beam so that the light beam is focused on the record carrier, said focusing control means causing a focusing control failure thereof when the focus error of the light beam on the record carrier is out of a focusing controllable range;

a tracking error detection means for detecting a position error between the light beam incident on the record carrier and a track and for generating a tracking error signal showing the position error in response thereof, said tracking error signal being valid when the light beam is under control of said focusing control means;

a moving means for moving the light beam on the record carrier in a direction traversing the tracks on the record carrier; and a focusing control failure detection means for judging that the focusing control failure of said focusing control means has occurred when a cycle of said tracking error signal which is produced during the movement of the light beam driven by said moving means has become longer than a predetermined cycle;

wherein the focusing control failure detection means changes said predetermined cycle in accordance with a value resulting from averaging of a plurality of cycles of the tracking error signal.

* * * * *